US008429656B1

(12) United States Patent
Duluk, Jr. et al.

(10) Patent No.: US 8,429,656 B1
(45) Date of Patent: Apr. 23, 2013

(54) THREAD COUNT THROTTLING FOR EFFICIENT RESOURCE UTILIZATION

(75) Inventors: Jerome F. Duluk, Jr., Palo Alto, CA (US); Bryon S. Nordquist, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1847 days.

(21) Appl. No.: 11/555,892

(22) Filed: Nov. 2, 2006

(51) Int. Cl.
*G06F 9/46* (2006.01)
*G06F 15/00* (2006.01)
*G06F 9/44* (2006.01)

(52) U.S. Cl.
USPC ............. 718/102; 718/100; 718/104; 712/22; 712/220

(58) Field of Classification Search .................. None
See application file for complete search history.

(56) References Cited

U.S. PATENT DOCUMENTS

| | | | | |
|---|---|---|---|---|
| 7,747,842 | B1 * | 6/2010 | Goudy et al. | 712/220 |
| 2002/0174318 | A1 | 11/2002 | Stuttard et al. | |
| 2004/0207630 | A1 * | 10/2004 | Moreton et al. | 345/543 |
| 2006/0095807 | A1 * | 5/2006 | Grochowski et al. | 713/324 |

OTHER PUBLICATIONS

S.J. Eggers et al., "Simultaneous Multithreading: A Platform for Next-Generation Processors" IEEE Micro, Sep.-Oct. 1997, p. 12-19.

* cited by examiner

*Primary Examiner* — Meng An
*Assistant Examiner* — Caroline H Arcos
(74) *Attorney, Agent, or Firm* — Kilpatrick Townsend & Stockton LLP

(57) ABSTRACT

Methods and apparatuses are presented for graphics operations with thread count throttling, involving operating a processor to carry out multiple threads of execution, wherein the processor comprises at least one execution unit capable of supporting up to a maximum number of threads, obtaining a defined memory allocation size for allocating, in at least one memory device, a thread-specific memory space for the multiple threads, obtaining a per thread memory requirement corresponding to the thread-specific memory space, determining a thread count limit based on the defined memory allocation size and the per thread memory requirement, and sending a command to the processor to cause the processor to limit the number of threads carried out by the at least one execution unit to a reduced number of threads, the reduced number of threads being less than the maximum number of threads.

16 Claims, 9 Drawing Sheets

THREAD COUNT THROTTLING FOR EFFICIENT RESOURCE UTILIZATION

BACKGROUND OF THE INVENTION

As graphics processing applications become increasingly more powerful, memory requirements associated with the execution of graphics instructions have correspondingly increased. To support such applications, processors supporting graphics operations may utilize additional memory outside the processor in carrying out graphics processing instructions. In a modern multithreaded processor capable of supporting a large number of active threads of execution, fixedly assigning a portion of outside memory to each thread of execution can easily result in the use of an exorbitant amount of outside memory. Nevertheless, a processor may need to capitalize on performance gains achieved through use of outside memory allotted to graphics processing on a per thread basis. Accordingly, there exists a compelling need for a technique that allows a multithreaded processor to take advantage of outside memory for execution of threads without consuming excessive allocations of such outside memory.

BRIEF SUMMARY OF THE INVENTION

The present invention relates to methods and apparatuses for performing graphics operations with thread count throttling, involving operating a processor to carry out multiple threads of execution of graphics processing operations, wherein the processor comprises at least one execution unit capable of supporting up to a maximum number of threads of execution, obtaining a defined memory allocation size for allocating, in at least one memory device, a thread-specific memory space for the multiple threads of execution, obtaining a per thread memory requirement corresponding to the thread-specific memory space, determining a thread count limit based on the defined memory allocation size and the per thread memory requirement, and sending a command to the processor to cause the processor to limit the number of threads carried out by the at least one execution unit to a reduced number of threads of execution, the reduced number of threads of execution being less than the maximum number of threads of execution.

Driver software may performs the steps of obtaining the defined memory allocation size, obtaining the per thread memory requirement, determining the thread count limit, and sending the command to the processor.

According to one embodiment, the at least one execution unit is toggled between a first mode of operation for carrying out the maximum number of threads of execution and a second mode of operation for carrying out the reduced number of threads of execution. Toggling between the first mode and the second mode may be performed dynamically, without requiring the processor to flush existing threads of execution through a pipeline in the at least one execution unit before starting new threads of execution. In the first mode, the processor does not access the thread-specific memory space, and in the second mode, the processor accesses the thread-specific memory space.

The thread-specific memory space may comprise a plurality of blocks of memory, each block of memory being associated with a thread of execution, and wherein blocks of memory associated with threads belonging to a SIMD group are organized together within a contiguous addressing range in the thread-specific memory space.

In one embodiment, the at least one execution unit may comprise at least one specialized graphics function module capable of performing one class of graphics operations associated with a particular stage of graphics processing, and where the maximum number of threads of execution and the reduced number of threads of execution apply to the at least one specialized graphics function module.

In another embodiment, the at least one execution unit comprises at least one combined function module capable of performing multiple classes of graphics operations, each of the multiple classes of graphics operations being associated with a different stage of graphics processing, and wherein the maximum number of threads of execution and the reduced number of threads of execution apply to the at least one specialized graphics function module.

In addition, a stack memory space may be allocated in the at least one memory device, wherein stack data corresponding to the multiple threads of execution are stored in the stack memory space.

In one embodiment of the invention, the at least one execution unit comprises a plurality of similarly structured components for carrying out the multiple threads of execution, including at least one operative component and at least one inoperative component. In this embodiment, the thread-specific memory space is decreased in size by allocating the thread-specific memory space for the at least one operative component and not for the at least one inoperative component.

DETAILED DESCRIPTION OF THE INVENTION

Illustrative System Level Description

Figure 1:
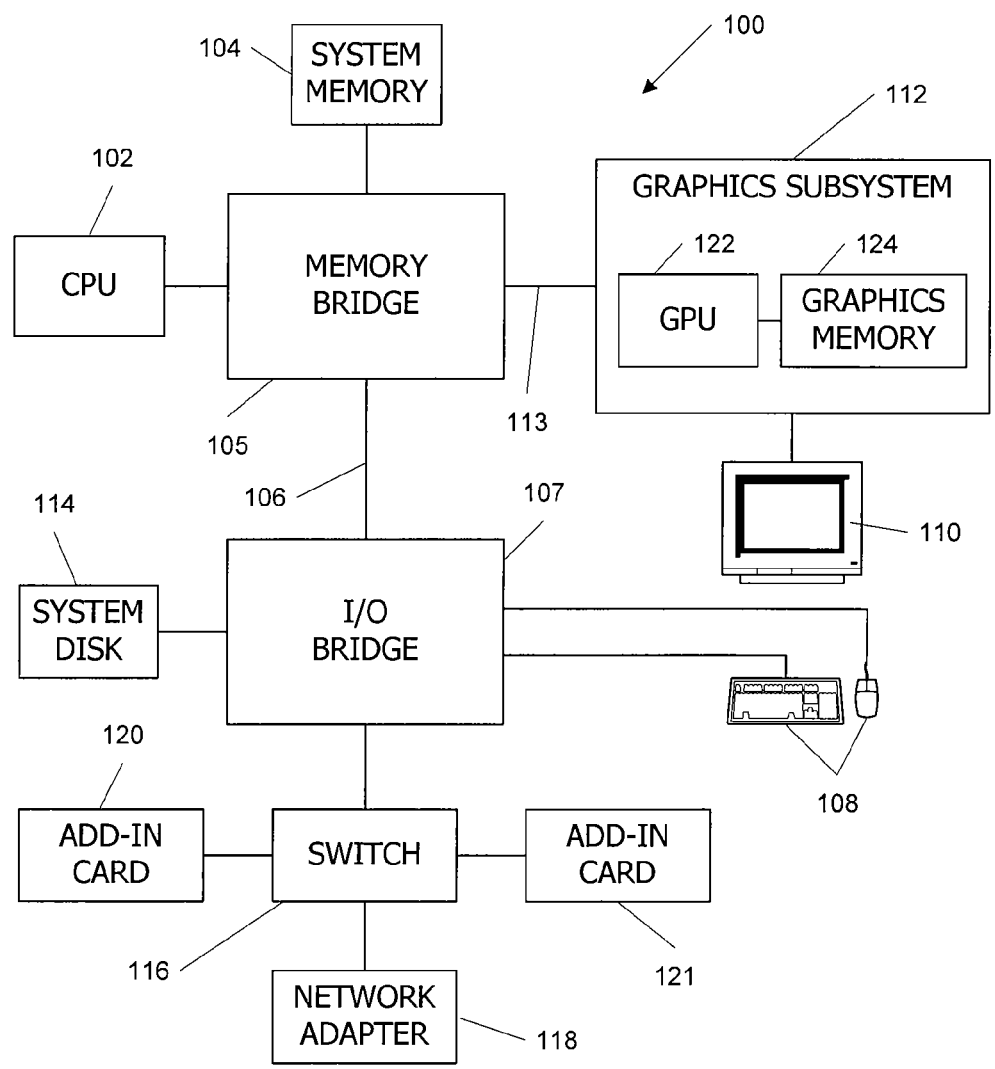
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a Hyper-Transport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2D or 3D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add in cards or peripheral devices might be supported. In some embodiments, switch 116 is eliminated, and network adapter 118 and add in cards 120, 121 connect directly to I/O bridge 107.

The connection of GPU 122 to the rest of system 100 may also be varied. In some embodiments, graphics system 112 is implemented as an add in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Rendering Pipeline Overview

Figure 2:
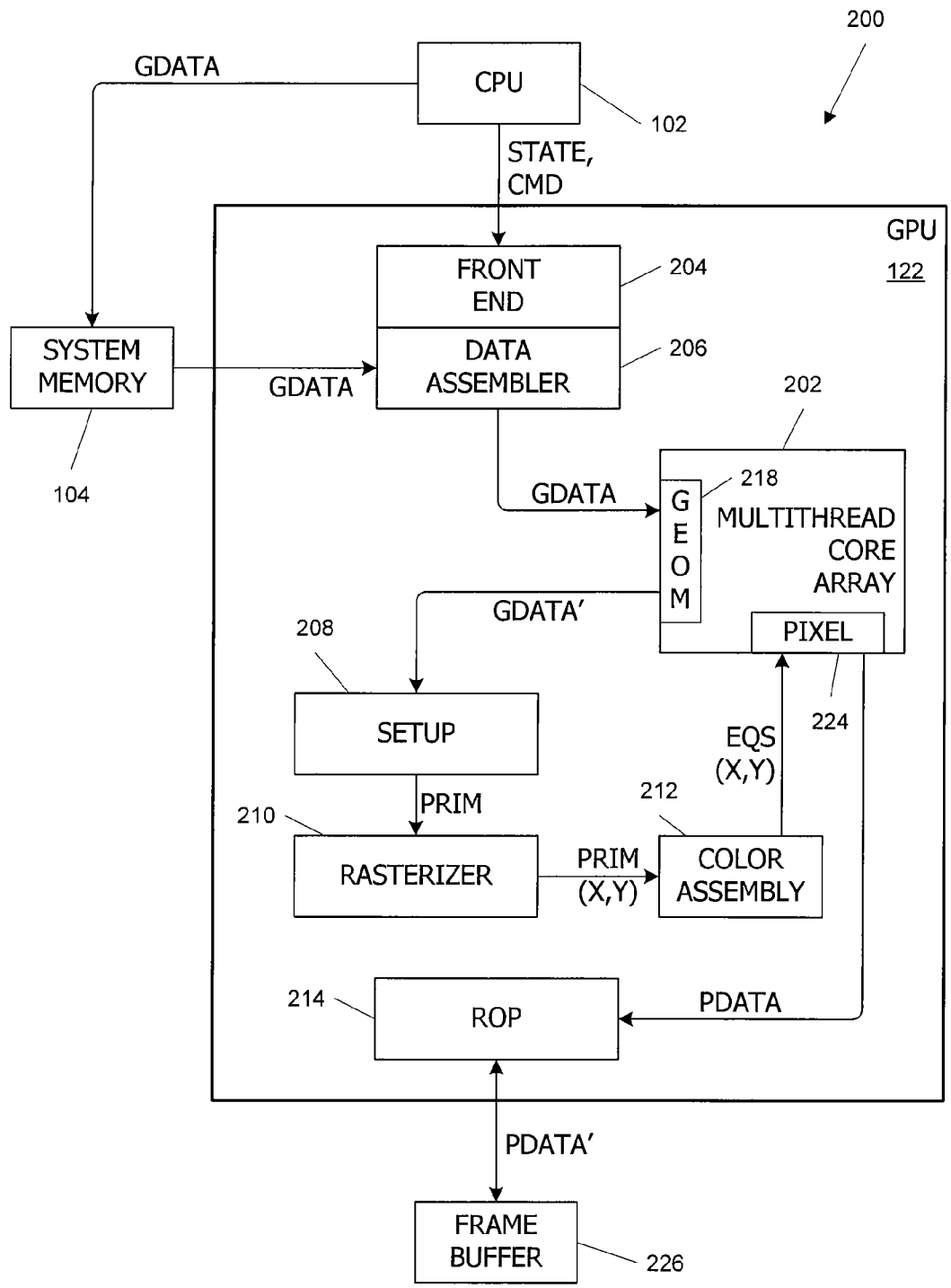
FIG. 2 is a block diagram of a rendering pipeline that can be implemented in a GPU shown in FIG. 1 according to an embodiment of the present invention.

FIG. 2 is a block diagram of a rendering pipeline 200 that can be implemented in GPU 122 of FIG. 1 according to an embodiment of the present invention. In this embodiment, rendering pipeline 200 is implemented using an architecture in which any applicable vertex shader programs, geometry shader programs, and pixel shader programs are executed using the same parallel-processing hardware, referred to herein as a "multithreaded core array" 202. Multithreaded core array 202 is described further below.

In addition to multithreaded core array 202, rendering pipeline 200 includes a front end 204 and data assembler 206, a setup module 208, a rasterizer 210, a color assembly module 212, and a raster operations module (ROP) 214, each of which can be implemented using conventional integrated circuit technologies or other technologies.

Front end 204 receives state information (STATE), rendering commands (CMD), and geometry data (GDATA), e.g., from CPU 102 of FIG. 1. In some embodiments, rather than providing geometry data directly, CPU 102 provides references to locations in system memory 104 at which geometry data is stored; data assembler 206 retrieves the data from system memory 104. The state information, rendering commands, and geometry data may be of a generally conventional nature and may be used to define the desired rendered image or images, including geometry, lighting, shading, texture, motion, and/or camera parameters for a scene.

In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex may have various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

The state information and rendering commands define processing parameters and actions for various stages of rendering pipeline 200. Front end 204 directs the state information and rendering commands via a control path (not explicitly shown) to other components of rendering pipeline 200. As is known in the art, these components may respond to received state information by storing or updating values in various control registers that are accessed during processing and may respond to rendering commands by processing data received in the pipeline.

Front end 204 directs the geometry data to data assembler 206. Data assembler 206 formats the geometry data and prepares it for delivery to a geometry module 218 in multithreaded core array 202.

Geometry module 218 directs programmable processing engines (not explicitly shown) in multithreaded core array 202 to execute vertex and/or geometry shader programs on the vertex data, with the programs being selected in response to the state information provided by front end 204. The vertex and/or geometry shader programs can be specified by the rendering application as is known in the art, and different shader programs can be applied to different vertices and/or primitives. The shader program(s) to be used can be stored in system memory or graphics memory and identified to multithreaded core array 202 via suitable rendering commands and state information as is known in the art. In some embodiments, vertex shader and/or geometry shader programs can be executed in multiple passes, with different processing operations being performed during each pass. Each vertex and/or geometry shader program determines the number of passes and the operations to be performed during each pass. Vertex and/or geometry shader programs can implement algorithms using a wide range of mathematical and logical operations on vertices and other data, and the programs can include conditional or branching execution paths and direct and indirect memory accesses.

Vertex shader programs and geometry shader programs can be used to implement a variety of visual effects, including lighting and shading effects. For instance, in a simple embodiment, a vertex program transforms a vertex from its 3D object coordinate system to a 3D clip space or world space coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. The vertex shader program applies this transformation matrix to each vertex of the primitives making up an object. More complex vertex shader programs can be used to implement a variety of visual effects, including lighting and shading, procedural geometry, and animation operations. Numerous examples of such per-vertex operations are known in the art, and a detailed description is omitted as not being critical to understanding the present invention.

Geometry shader programs differ from vertex shader programs in that geometry shader programs operate on primitives (groups of vertices) rather than individual vertices. Thus, in some instances, a geometry program may create new vertices and/or primitives, and/or also remove vertices or primitives from the set of objects being processed. In some embodiments, passes through a vertex shader program and a geometry shader program can be alternated to process the geometry data.

In some embodiments, vertex shader programs and geometry shader programs are executed using the same programmable processing engines in multithreaded core array 202. Thus, at certain times, a given processing engine may operate as a vertex shader, receiving and executing vertex program instructions, and at other times the same processing engine may operates as a geometry shader, receiving and executing geometry program instructions. The processing engines can be multithreaded, and different threads executing different types of shader programs may be in flight concurrently in multithreaded core array 202.

After the vertex and/or geometry shader programs have executed, geometry module 218 passes the processed geometry data (GDATA') to setup module 208. Setup module 208, which may be of generally conventional design, generates edge equations from the clip space or screen space coordinates of each primitive; the edge equations are advantageously usable to determine whether a point in screen space is inside or outside the primitive.

Setup module 208 provides each primitive (PRIM) to rasterizer 210. Rasterizer 210, which may be of generally conventional design, determines which (if any) pixels are covered by the primitive, e.g., using conventional scan-conversion algorithms. As used herein, a "pixel" (or "fragment") refers generally to a region in 2-D screen space for which a single color value is to be determined; the number and arrangement of pixels can be a configurable parameter of rendering pipeline 200 and might or might not be correlated with the screen resolution of a particular display device. As is known in the art, pixel color may be sampled at multiple locations within the pixel (e.g., using conventional supersampling or multisampling techniques), and in some embodiments, supersampling or multisampling is handled within the pixel shader.

After determining which pixels are covered by a primitive, rasterizer 210 provides the primitive (PRIM), along with a list of screen coordinates (X,Y) of the pixels covered by the primitive, to a color assembly module 212. Color assembly module 212 associates the primitives and coverage information received from rasterizer 210 with attributes (e.g., color components, texture coordinates, surface normals) of the vertices of the primitive and generates plane equations (or other suitable equations) defining some or all of the attributes as a function of position in screen coordinate space.

These attribute equations are advantageously usable in a pixel shader program to interpolate a value for the attribute at any location within the primitive; conventional techniques can be used to generate the equations. For instance, in one embodiment, color assembly module 212 generates coefficients A, B, and C for a plane equation of the form $U=Ax+By+C$ for each attribute U.

Color assembly module 212 provides the attribute equations (EQS, which may include e.g., the plane-equation coefficients A, B and C) for each primitive that covers at least one pixel and a list of screen coordinates (X,Y) of the covered pixels to a pixel module 224 in multithreaded core array 202. Pixel module 224 directs programmable processing engines (not explicitly shown) in multithreaded core array 202 to execute one or more pixel shader programs on each pixel covered by the primitive, with the program(s) being selected in response to the state information provided by front end 204. As with vertex shader programs and geometry shader programs, rendering applications can specify the pixel shader program to be used for any given set of pixels. Pixel shader programs can be used to implement a variety of visual effects, including lighting and shading effects, reflections, texture blending, procedural texture generation, and so on. Numerous examples of such per-pixel operations are known in the art and a detailed description is omitted as not being critical to understanding the present invention. Pixel shader programs can implement algorithms using a wide range of mathematical and logical operations on pixels and other data, and the programs can include conditional or branching execution paths and direct and indirect memory accesses.

Pixel shader programs are advantageously executed in multithreaded core array 202 using the same programmable processing engines that also execute the vertex and/or geometry shader programs. Thus, at certain times, a given processing engine may operate as a vertex shader, receiving and executing vertex program instructions; at other times the same processing engine may operates as a geometry shader, receiving and executing geometry program instructions; and at still other times the same processing engine may operate as a pixel shader, receiving and executing pixel shader program instructions. It will be appreciated that the multithreaded core array can provide dynamic hardware-controlled load-balancing: where the application is geometry intensive (e.g., many small primitives), a larger fraction of the processing cycles in multithreaded core array 202 will tend to be devoted to vertex and/or geometry shaders, and where the application is pixel intensive (e.g., fewer and larger primitives shaded using complex pixel shader programs with multiple textures and the like), a larger fraction of the processing cycles will tend to be devoted to pixel shaders.

Once processing for a pixel or group of pixels is complete, pixel module 224 provides the processed pixels (PDATA) to ROP 214. ROP 214, which may be of generally conventional design, integrates the pixel values received from pixel module 224 with pixels of the image under construction in frame buffer 226, which may be located, e.g., in graphics memory 124. In some embodiments, ROP 214 can mask pixels or blend new pixels with pixels previously written to the rendered image. Depth buffers, alpha buffers, and stencil buffers can also be used to determine the contribution (if any) of each incoming pixel to the rendered image. Pixel data PDATA' corresponding to the appropriate combination of each incoming pixel value and any previously stored pixel value is written back to frame buffer 226. Once the image is complete, frame buffer 226 can be scanned out to a display device and/or subjected to further processing.

It will be appreciated that the rendering pipeline described herein is illustrative and that variations and modifications are possible. The pipeline may include different units from those shown and the sequence of processing events may be varied from that described herein. For instance, in some embodiments, rasterization may be performed in stages, with a "coarse" rasterizer that processes the entire screen in blocks (e.g., 16×16 pixels) to determine which, if any, blocks the triangle covers (or partially covers), followed by a "fine" rasterizer that processes the individual pixels within any block that is determined to be at least partially covered. In one such embodiment, the fine rasterizer is contained within pixel module 224. In another embodiment, some operations conventionally performed by a ROP may be performed within pixel module 224 before the pixel data is forwarded to ROP 214.

Further, multiple instances of some or all of the modules described herein may be operated in parallel. In one such embodiment, multithreaded core array 202 includes two or more geometry modules 218 and an equal number of pixel modules 224 that operate in parallel. Each geometry module and pixel module jointly control a different subset of the processing engines in multithreaded core array 202.

Multithreaded Core Array Configuration

Figure 3:
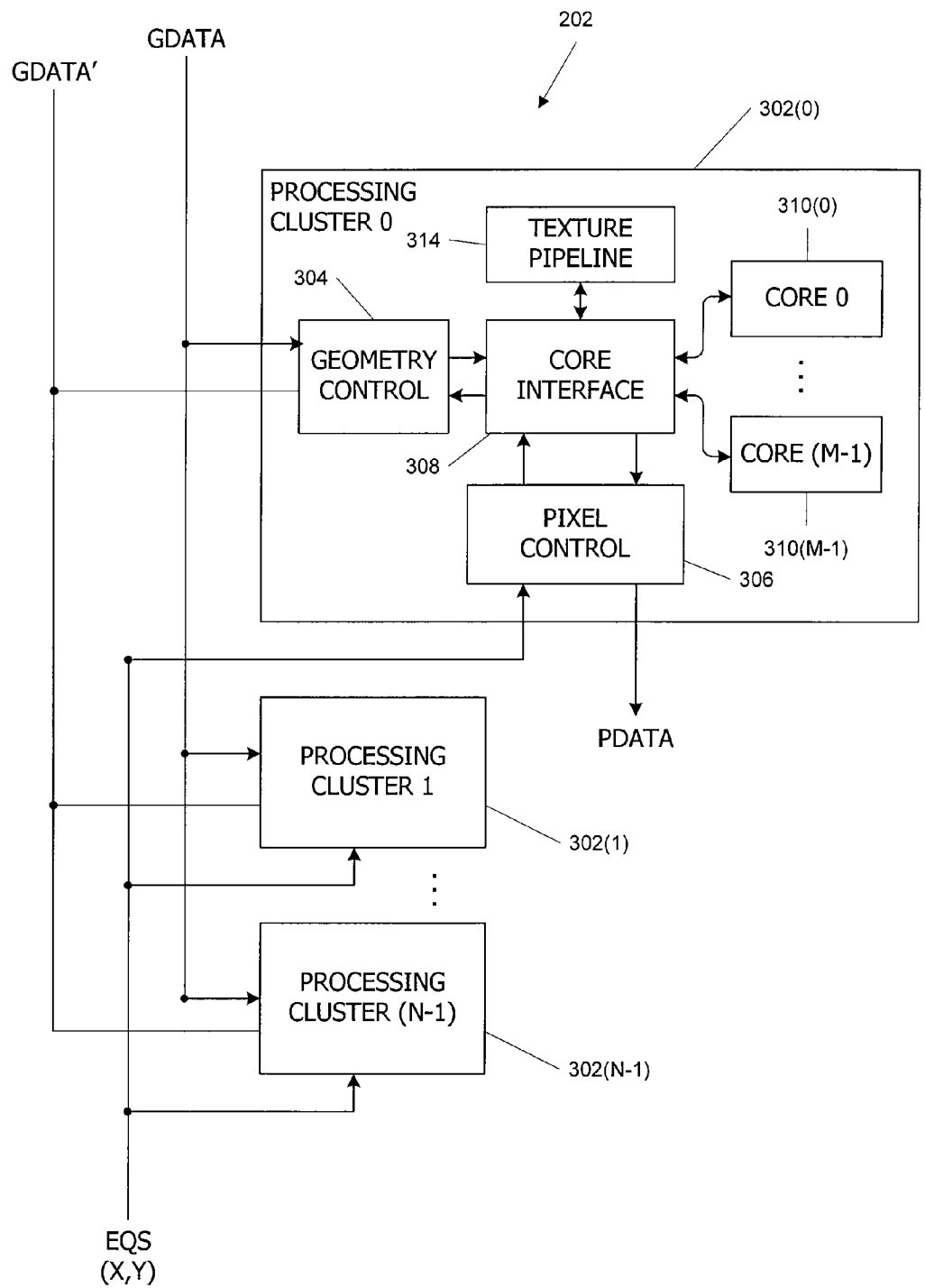
FIG. 3 is a block diagram of multithreaded core array according to an embodiment of the present invention.

In one embodiment, multithreaded core array 202 provides a highly parallel architecture that supports concurrent execution of a large number of instances of vertex, geometry, and/or pixel shader programs in various combinations. FIG. 3 is a block diagram of multithreaded core array 202 according to an embodiment of the present invention.

In this embodiment, multithreaded core array 202 includes some number (N) of processing clusters 302. Herein, multiple instances of like objects are denoted with reference numbers identifying the object and parenthetical numbers identifying the instance where needed. Any number N (e.g., 1, 4, 8, or any other number) of processing clusters may be provided. In FIG. 3, one processing cluster 302 is shown in detail; it is to be understood that other processing clusters 302 can be of similar or identical design.

Each processing cluster 302 includes a geometry controller 304 (implementing geometry module 218 of FIG. 2) and a pixel controller 306 (implementing pixel module 224 of FIG. 2). Geometry controller 304 and pixel controller 306 each communicate with a core interface 308. Core interface 308 controls a number (M) of cores 310 that include the processing engines of multithreaded core array 202. Any number M (e.g., 1, 2, 4 or any other number) of cores 310 may be connected to a single core interface. Each core 310 is advantageously implemented as a multithreaded execution core capable of supporting a large number (e.g., 100 or more) of concurrent execution threads (where the term "thread" refers to an instance of a particular program executing on a particular set of input data), including a combination of vertex threads, geometry threads, and pixel threads. An example architecture for a representative core 310 is described below with reference to FIG. 4.

Core interface 308 also controls a texture pipeline 314 that is shared among cores 310. Texture pipeline 314, which may be of generally conventional design, advantageously includes logic circuits configured to receive texture coordinates, to fetch texture data corresponding to the texture coordinates from memory, and to filter the texture data according to various algorithms. Conventional filtering algorithms including bilinear and trilinear filtering may be used. When a core 310 encounters a texture instruction in one of its threads, it provides the texture coordinates to texture pipeline 314 via core interface 308. Texture pipeline 314 processes the texture instruction and returns the result to the core 310 via core interface 308. Texture processing by pipeline 314 may consume a significant number of clock cycles, and while a thread is waiting for the texture result, core 310 advantageously continues to execute other threads.

In operation, data assembler 206 (FIG. 2) provides geometry data GDATA to processing clusters 302. In one embodiment, data assembler 206 divides the incoming stream of geometry data into portions and selects, e.g., based on availability of execution resources, which of processing clusters 302 is to receive the next portion of the geometry data. That portion is delivered to geometry controller 304 in the selected processing cluster 302.

Geometry controller 304 forwards the received data to core interface 308, which loads the vertex data into a core 310, then instructs core 310 to launch the appropriate vertex shader program. Upon completion of the vertex shader program, core interface 308 signals geometry controller 304. If a geometry shader program is to be executed, geometry controller 304 instructs core interface 308 to launch the geometry shader program. In some embodiments, the processed vertex data is returned to geometry controller 304 upon completion of the vertex shader program, and geometry controller 304 instructs core interface 308 to reload the data before executing the geometry shader program. After completion of the vertex shader program and/or geometry shader program, geometry controller 304 provides the processed geometry data (GDATA') to setup module 208 of FIG. 2.

At the pixel stage, color assembly module 212 (FIG. 2) provides attribute equations EQS for a primitive and pixel coordinates (X,Y) of pixels covered by the primitive to processing clusters 302. In one embodiment, color assembly module 212 divides the incoming stream of coverage data into portions and selects, e.g., based on availability of execution resources or the location of the primitive in screen coordinates, which of processing clusters 302 is to receive the next portion of the data. That portion is delivered to pixel controller 306 in the selected processing cluster 302.

Pixel controller 306 delivers the data to core interface 308, which loads the pixel data into a core 310, then instructs the core 310 to launch the pixel shader program. Where core 310 is multithreaded, pixel shader programs, geometry shader programs, and vertex shader programs can all be executed concurrently in the same core 310. Upon completion of the pixel shader program, core interface 308 delivers the processed pixel data to pixel controller 306, which forwards the pixel data PDATA to ROP unit 214 (FIG. 2).

It will be appreciated that the multithreaded core array described herein is illustrative and that variations and modifications are possible. Any number of processing clusters may be provided, and each processing cluster may include any number of cores. In some embodiments, shaders of certain types may be restricted to executing in certain processing clusters or in certain cores; for instance, geometry shaders might be restricted to executing in core 310(0) of each processing cluster. Such design choices may be driven by considerations of hardware size and complexity versus performance, as is known in the art. A shared texture pipeline is also optional; in some embodiments, each core might have its own texture pipeline or might leverage general-purpose functional units to perform texture computations.

Data to be processed can be distributed to the processing clusters in various ways. In one embodiment, the data assembler (or other source of geometry data) and color assembly module (or other source of pixel-shader input data) receive information indicating the availability of processing clusters or individual cores to handle additional threads of various types and select a destination processing cluster or core for each thread. In another embodiment, input data is forwarded from one processing cluster to the next until a processing cluster with capacity to process the data accepts it. In still another embodiment, processing clusters are selected based on properties of the input data, such as the screen coordinates of pixels to be processed.

The multithreaded core array can also be leveraged to perform general-purpose computations that might or might not be related to rendering images. In one embodiment, any computation that can be expressed in a data-parallel decomposition can be handled by the multithreaded core array as an array of threads executing in a single core. Results of such computations can be written to the frame buffer and read back into system memory.

Core Architecture

Figure 4:
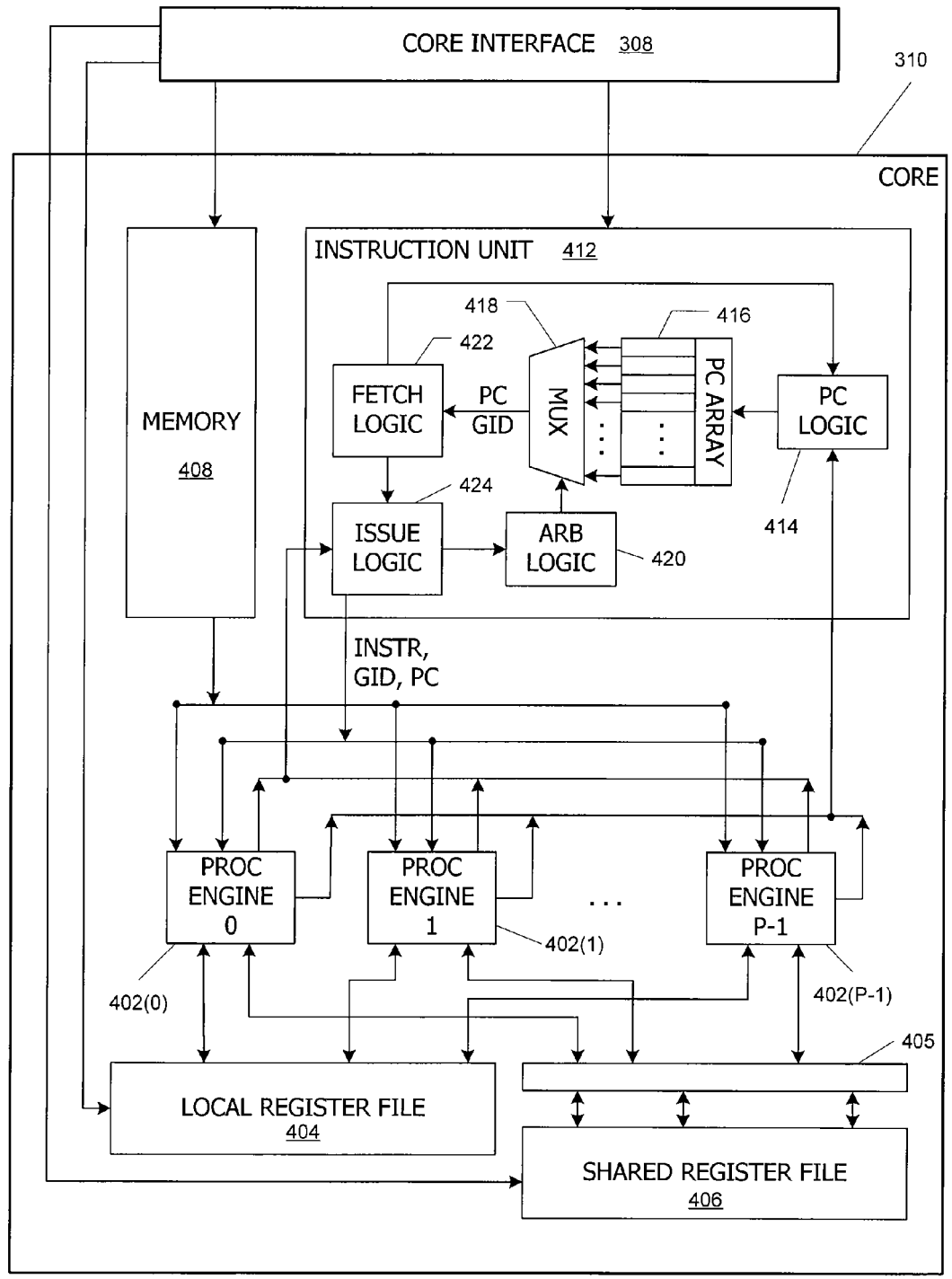
FIG. 4 is a block diagram of a core according to an embodiment of the present invention.

FIG. 4 is a block diagram of a core 310 according to an embodiment of the present invention. Core 310 is advantageously configured to execute a large number of threads in parallel, where the term "thread" refers to an instance of a particular program executing on a particular set of input data. For example, a thread can be an instance of a vertex shader program executing on the attributes of a single vertex or a pixel shader program executing on a given primitive and pixel. In some embodiments, single-instruction, multiple-data (SIMD) instruction issue techniques are used to support parallel execution of a large number of threads without providing multiple independent instruction fetch units.

In one embodiment, core 310 includes an array of P (e.g., 16) parallel processing engines 402 configured to receive SIMD instructions from a single instruction unit 412. Each parallel processing engine 402 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 402 is allocated space in a local register file 404 for storing its local input data, intermediate results, and the like. In one embodiment, local register file 404 is physically or logically divided into P lanes, each having some number of entries (where each entry might be, e.g., a 32-bit word). One lane is allocated to each processing unit, and corresponding entries in different lanes can be populated with data for corresponding thread types to facilitate SIMD execution. The number of entries in local register file 404 is advantageously large enough to support multiple concurrent threads per processing engine 402.

Each processing engine 402 also has access, via a crossbar switch 405, to a shared register file 406 that is shared among all of the processing engines 402 in core 310. Shared register file 406 may be as large as desired, and in some embodiments, any processing engine 402 can read to or write from any location in shared register file 406. In addition to shared register file 406, some embodiments also provide an on-chip shared memory 408, which may be implemented, e.g., as a conventional RAM. On-chip memory 408 is advantageously used to store data that is expected to be used in multiple threads, such as coefficients of attribute equations, which are usable in pixel shader programs. In some embodiments, processing engines 402 may also have access to additional off-chip shared memory (not shown), which might be located, e.g., within graphics memory 124 of FIG. 1.

In one embodiment, each processing engine 402 is multithreaded and can execute up to some number G (e.g., 24) of threads concurrently, e.g., by maintaining current state information associated with each thread in a different portion of its allocated lane in local register file 406. Processing engines 402 are advantageously designed to switch rapidly from one thread to another so that, for instance, a program instruction from a vertex thread could be issued on one clock cycle, followed by a program instruction from a different vertex thread or from a different type of thread such as a geometry thread or a pixel thread, and so on.

Instruction unit 412 is configured such that, for any given processing cycle, the same instruction (INSTR) is issued to all P processing engines 402. Thus, at the level of a single clock cycle, core 310 implements a P-way SIMD microarchitecture. Since each processing engine 402 is also multi-threaded, supporting up to G threads, core 310 in this embodiment can have up to P*G threads in flight concurrently. For instance, if P=16 and G=24, then core 310 supports up to 384 concurrent threads.

Because instruction unit 412 issues the same instruction to all P processing engines 402 in parallel, core 310 is advantageously used to process threads in "SIMD groups." As used herein, a "SIMD group" refers to a group of up to P threads of execution of the same program on different input data, with one thread of the group being assigned to each processing engine 402. For example, a SIMD group might consist of P vertices, each being processed using the same vertex shader program. (A SIMD group may include fewer than P threads, in which case some of processing engines 402 will be idle during cycles when that SIMD group is being processed.) Since each processing engine 402 can support up to G threads, it follows that up to G SIMD groups can be in flight in core 310 at any given time.

On each clock cycle, one instruction is issued to all P threads making up a selected one of the G SIMD groups. To indicate which thread is currently active, a "group index" (GID) for the associated thread may be included with the instruction. Processing engine 402 uses group index GID as a context identifier, e.g., to determine which portion of its allocated lane in local register file 404 should be used when executing the instruction. Thus, in a given cycle, all processing engines 402 in core 310 are nominally executing the same instruction for different threads in the same group. In some embodiments, an active mask is applied at instruction issue to control which processing engines 402 execute the instruction so that an instruction can be executed in parallel for a subset of the threads in the SIMD group thereby allowing threads in a SIMD group to diverge.

Instruction unit 412 includes program counter (PC) logic 414, a program counter register array 416, a multiplexer 418, arbitration logic 420, fetch logic 422, and issue logic 424. Program counter register array 416 stores G program counter values (one per SIMD group), which are updated independently of each other by PC logic 414. PC logic 414 updates the PC values based on information received from processing engines 402 and/or fetch logic 422. PC logic 414 is advantageously configured to track divergence among threads in a SIMD group and to select instructions in a way that ultimately results in the threads resynchronizing.

Fetch logic 422, which may be of generally conventional design, is configured to fetch an instruction corresponding to a program counter value PC from an instruction store (not shown) and to provide the fetched instructions to issue logic 424. In some embodiments, fetch logic 422 (or issue logic 424) may also include decoding logic that converts the instructions into a format recognizable by processing engines 402.

Arbitration logic 420 and multiplexer 418 determine the order in which instructions are fetched. More specifically, on each clock cycle, arbitration logic 420 selects one of the G possible group indices GID as the SIMD group for which a next instruction should be fetched and supplies a corresponding control signal to multiplexer 418, which selects the corresponding PC. Arbitration logic 420 may include conventional logic for prioritizing and selecting among concurrent threads (e.g., using round-robin, least-recently serviced, or the like), and selection may be based in part on feedback information from fetch logic 422 or issue logic 424 as to how many instructions have been fetched but not yet issued for each SIMD group.

Fetch logic 422 provides the fetched instructions, together with the group index GID and program counter value PC, to issue logic 424. In some embodiments, issue logic 424 maintains a queue of fetched instructions for each in-flight SIMD group. Issue logic 424, which may be of generally conventional design, receives status information from processing engines 402 indicating which SIMD groups are ready to execute a next instruction. Based on this information, issue logic 424 selects a next instruction to issue and issues the selected instruction, together with the associated PC value and GID. Each processing engine 402 either executes or ignores the instruction, depending on an active mask associated with the group index GID. In one embodiment, the active mask reflects the presence or absence of idle threads in the SIMD group and/or divergence in the execution paths taken by different threads in the SIMD group.

In one embodiment, instructions within a SIMD group are issued in order relative to each other, but the next instruction to be issued can be associated with any one of the SIMD groups. For instance, if in the context of one SIMD group, one or more processing engines 402 are waiting for a response from other system components (e.g., off-chip memory or texture pipeline 314 of FIG. 3), issue logic 424 advantageously selects a group index GID corresponding to a different SIMD group.

For optimal performance, all threads within a SIMD group are advantageously launched on the same clock cycle so that they begin in a synchronized state. In one embodiment, core interface 308 advantageously loads a SIMD group into core 310, then instructs core 310 to launch the group. "Loading" a group includes supplying instruction unit 412 and processing engines 402 with input data and other parameters required to execute the applicable program. For example, in the case of vertex processing, core interface 308 loads the starting PC value for the vertex shader program into a slot in PC array 416 that is not currently in use; this slot corresponds to the group index GID assigned to the new SIMD group that will process vertex threads. Core interface 308 allocates sufficient space for an input buffer (e.g., in shared register file 406 or local register file 404) for each processing engine 402 to execute one vertex thread, then loads the vertex data. In one embodiment, all data for the first vertex in the group is loaded into a lane of the input buffer allocated to processing engine 402(0), all data for the second vertex is in a lane of the input buffer allocated to processing engine 402(1), and so on. In some embodiments, data for multiple vertices in the group can be loaded in parallel.

Once all the data for the group has been loaded, core interface 308 launches the SIMD group by signaling to instruction unit 412 to begin fetching and issuing instructions corresponding to the group index GID of the new group. SIMD groups for geometry and pixel threads can be loaded and launched in a similar fashion.

It should be noted that although all threads within a group are executing the same program and are initially synchronized with each other, the execution paths of different threads in the group might diverge during the course of program execution. Instruction unit 412 advantageously manages instruction fetch and issue for each SIMD group so as to ensure that threads in a group that have diverged eventually resynchronize. For instance, in one embodiment, instruction unit 412 maintains a branch token stack for each SIMD group. If a branch is taken by some threads in a SIMD group ("taken threads") but not by others ("not-taken threads"), a token is pushed onto the SIMD group's branch token stack. The token includes a mask identifying the not-taken threads. Instruction unit 412 continues to fetch instructions for the taken threads; these instructions are issued to all processing engines 402 with an active mask set such that the instructions are executed for the taken threads but not for the not-taken threads. Execution of the taken threads continues until a point in the instruction stream at which the branch-taken path and the branch-not-taken path merge. The merge point can be identified, e.g., by a flag or other indicator associated with the instruction where the merge occurs.

Once the merge point is reached, instruction unit 412 pops the token off the branch token stack and begins fetching instructions for the not-taken threads; these instructions are issued to all processing engines 402 with the active mask set such that the instructions are executed for not-taken threads but not for taken threads. Execution of the not-taken threads continues until the merge point is reached. Thereafter, the taken and not-taken active masks are merged into a single active mask, and fetching and executing continues.

It will be appreciated that the core architecture described herein is illustrative and that variations and modifications are possible. Any number of processing units may be included. In some embodiments, each processing unit has its own local register file, and the allocation of local register file entries per thread can be fixed or configurable as desired.

In some embodiments, core 310 is operated at a higher clock rate than core interface 308, allowing the core to process more data using less hardware in a given amount of time. For instance, core 310 can be operated at a clock rate that is twice the clock rate of core interface 308. If core 310 includes P processing engines 402 producing data at twice the core interface clock rate, then core 310 can produce 2*P results per core interface clock. Provided there is sufficient space in local register file 404, from the perspective of core interface 308, the situation is effectively identical to a core with 2*P processing units. Thus, P-way SIMD parallelism could be produced either by including P processing units in core 310 and operating core 310 at the same clock rate as core interface 308 or by including P/2 processing units in core 310 and operating core 310 at twice the clock rate of core interface 308. Other timing variations are also possible.

In another alternative embodiment, SIMD groups containing more than P threads ("supergroups") can be defined. A supergroup is defined by associating the group index values of two (or more) of the SIMD groups (e.g., GID1 and GID2) with each other. When issue logic 424 selects a supergroup, it issues the same instruction twice on two successive cycles: on one cycle, the instruction is issued for GID1, and on the next cycle, the same instruction is issued for GID2. Thus, the supergroup is in effect a SIMD group. Supergroups can be used to reduce the number of distinct program counters, state definitions, and other per-group parameters that need to be maintained without reducing the number of concurrent threads.

Thread Count Throttling

Figure 5A:
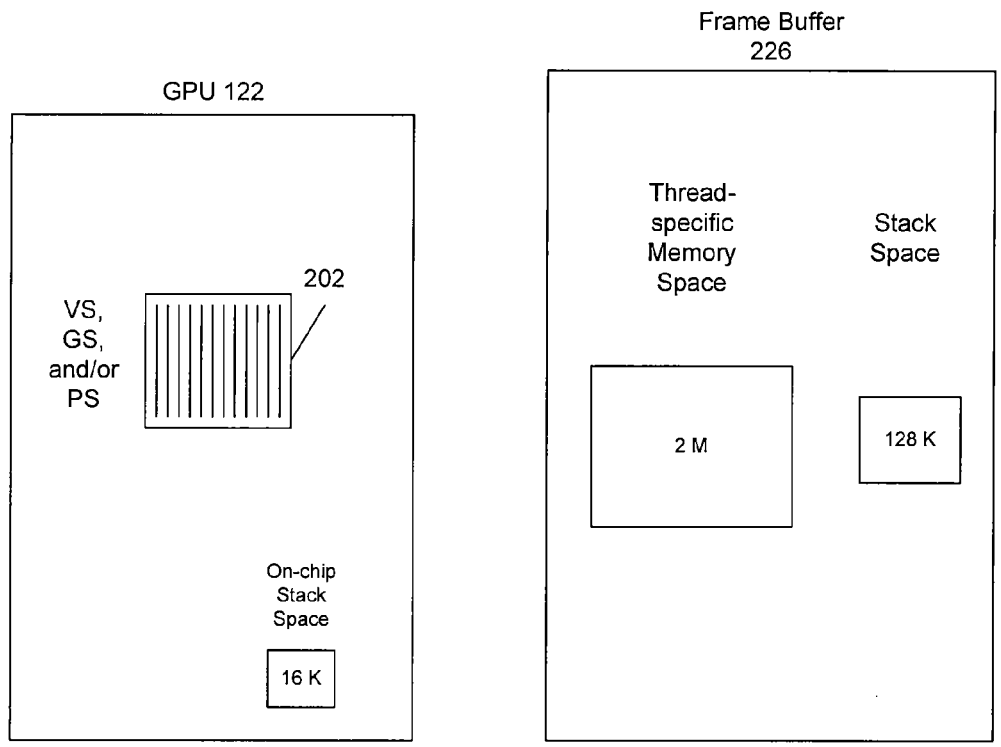
FIG. 5A shows a GPU along side a frame buffer that contains thread-specific memory space and stack space allocated to serve multiple threads being executed within the GPU, in accordance with an embodiment of the invention.

According to an embodiment of the invention, the number of threads carried out by an execution unit in a GPU may be dynamically throttled in view of memory allocation limitations. FIG. 5A shows GPU 122 along side frame buffer 226, which contains thread-specific memory space and stack space allocated to serve multiple threads being executed within GPU 122, in accordance with an embodiment of the invention. Here, GPU 122 is shown as containing a multithreaded core array 202 that executes the multiple threads. Multithreaded core array 202 has been described in detail previously, and it is an example of a combined function module that performs multiple classes of graphics operations associated with different stages of graphics processing. For example, multithreaded core array 202 may be capable of carrying out vertex shading programs, geometry shading programs, and/or pixel shading programs. Thus, the threads of execution found in multithreaded core array 202 may be performed on instructions from different types of programs.

As shown in this example, frame buffer 226 contains an allocation of thread-specific memory space having a size of 2048 kilobytes (shown as approximately 2 megabytes, or "2M"). Frame buffer 226 also contains an allocation of stack space having a size of 128 kilobytes ("128K"). These portions of memory are allocated in frame buffer 226 to serve the multiple threads of execution carried out in multithread core array 202. While multithreaded core array 202 may already contain internal memory that supports the execution of threads, the extra memory space allocated in frame buffer 226 may provide additional capacity that can be used in memory intensive tasks. In this embodiment, frame buffer 226 is implemented in at least one memory device separate from GPU 122. For example, frame buffer 226 may be implemented in one or more memory chips. In another embodiment, frame buffer 226 may be implemented on the same silicon device as GPU 122.

In the present embodiment of the invention, the number of threads allowed to be carried out in multithread core array 202 may be throttled. Even though multithread core array 202 may be built to support a maximum number of concurrently active threads of execution, a limit may be placed on the number of threads that the multithread core array 202 is allowed to execute. This represents a reduced number of threads that is less than the maximum number of threads that multithread core array 202 otherwise supports.

Here, driver software executing on CPU 102 (shown in FIG. 2) may calculate the appropriate value that represents the reduced number of threads. The calculation may take into account (1) a defined total amount of thread-specific memory allocation available and (2) the amount of thread-specific memory required per thread. These two parameters may be controlled, for instance, by an application program (e.g., a video game) executing on CPU 102. Just as an example, the operating system, privileged resource manager, or driver may define the total amount of thread-specific memory allocation to be 2048 kilobytes, and the application program may define the per thread memory requirement to be 1 kilobyte. Thus, the driver software may calculate that given these two parameters, there is only enough thread-specific memory in frame buffer 226 available for 2048 threads. Thus, the driver software may send a command to GPU 122, to limit the total number of threads executed by multithreaded core array 202 to a reduced number of 2048 threads.

Thread count throttling may occur during operation of GPU 122. Continuing with the example discussed above, the application program may decide at a later point in time to re-define the thread-specific memory required per thread, to a value of 4096 kilobytes. This may occur, for example, if the application program is about to take on a routine that is more memory intensive. Here, the driver software re-calculates that given the total amount of thread-specific memory allocation of 2048 kilobytes and the newly defined per thread memory requirement of 4 kilobytes, there is only enough thread-specific memory in frame buffer 226 available for 512 threads.

Thus, the driver software may send a command to GPU 122, to limit the total number of threads executed by multithreaded core array 202 to a reduced number of 512 threads.

As shown in FIG. 5A, frame buffer 226 may also include an allocation of stack space to support multiple threads of execution carried out in multithread core array 202. Here, the stack space is shown as having a size of 128 kilobytes. Thread count throttling may also take into account the allocation of this stack space in frame buffer 226. For instance, a reduced number of threads may also be calculated based on the total amount of stack space allocated in frame buffer 226 and a per thread stack space requirement, in a similar manner as that described above with respect to thread-specific memory. In certain embodiments, where a single-instruction, multiple-data (SIMD) configuration is adopted, each stack may control multiple threads of execution. There, the amount of stack space required would be based on the number of SIMD groups, each having multiple threads. Thus, the "per thread" stack space requirement may be defined as a "per SIMD group" stack space requirement.

Figure 5B:
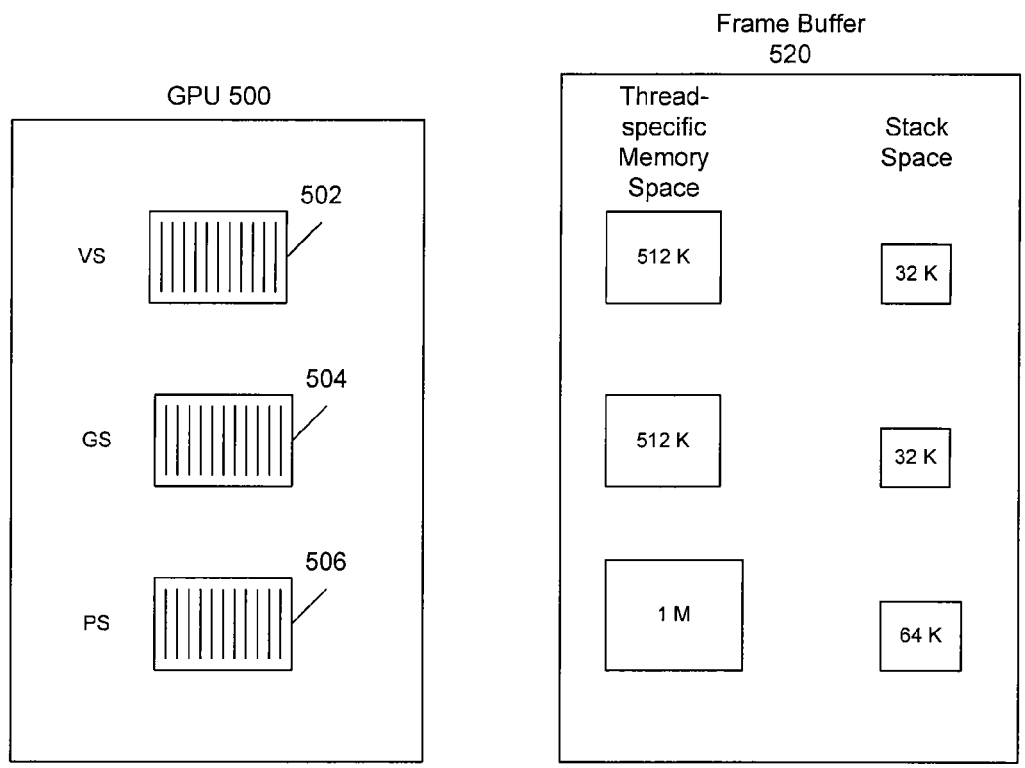
FIG. 5B shows a GPU along side a frame buffer that contains thread-specific memory space and stack space allocated to serve multiple threads being executed within the GPU, in accordance with another embodiment of the invention.

FIG. 5B shows GPU 500 along side frame buffer 520, which contains thread-specific memory space and stack space allocated to serve multiple threads being executed within GPU 500, in accordance with another embodiment of the invention. Here, GPU 500 is shown as containing a vertex shader unit 502, a geometry shader unit 504, and a pixel shader unit 506. Each of these shader units represents a specialized graphics function module that is capable of performing one class of graphics operations associated with a particular stage of graphics processing. Vertex shader unit 502 is executes vertex shader programs, geometry shader unit 504 executes geometry shader programs, and pixel shader unit 506 executes pixel shader programs.

In the present embodiment of the invention, thread count throttling may be performed separately for each of the specialized shader units or for each type of shader executed in multithreaded cores. As shown in FIG. 5B, there are three groupings of execution units and corresponding memory allocations in frame buffer 226. The first group includes vertex shader unit 502 and a corresponding thread specific memory space of size 512 kilobytes, along with a stack space of size 32 kilobytes. The second group includes geometry shader unit 504 and a corresponding thread specific memory space of size 512 kilobytes, along with a stack space of size 32 kilobytes. The third group includes pixel shader unit 506 and a corresponding thread specific memory space of size 1024 kilobytes (shown as approximately 1 megabyte, or "1M"), along with a stack space of size 64 kilobytes. Thread count throttling may be performed separately for each group, in a manner similar to that discussed above with respect to FIG. 5A. Thus, in this embodiment, each specialized shader unit or thread type has its own thread count throttling mechanism.

Figure 6:
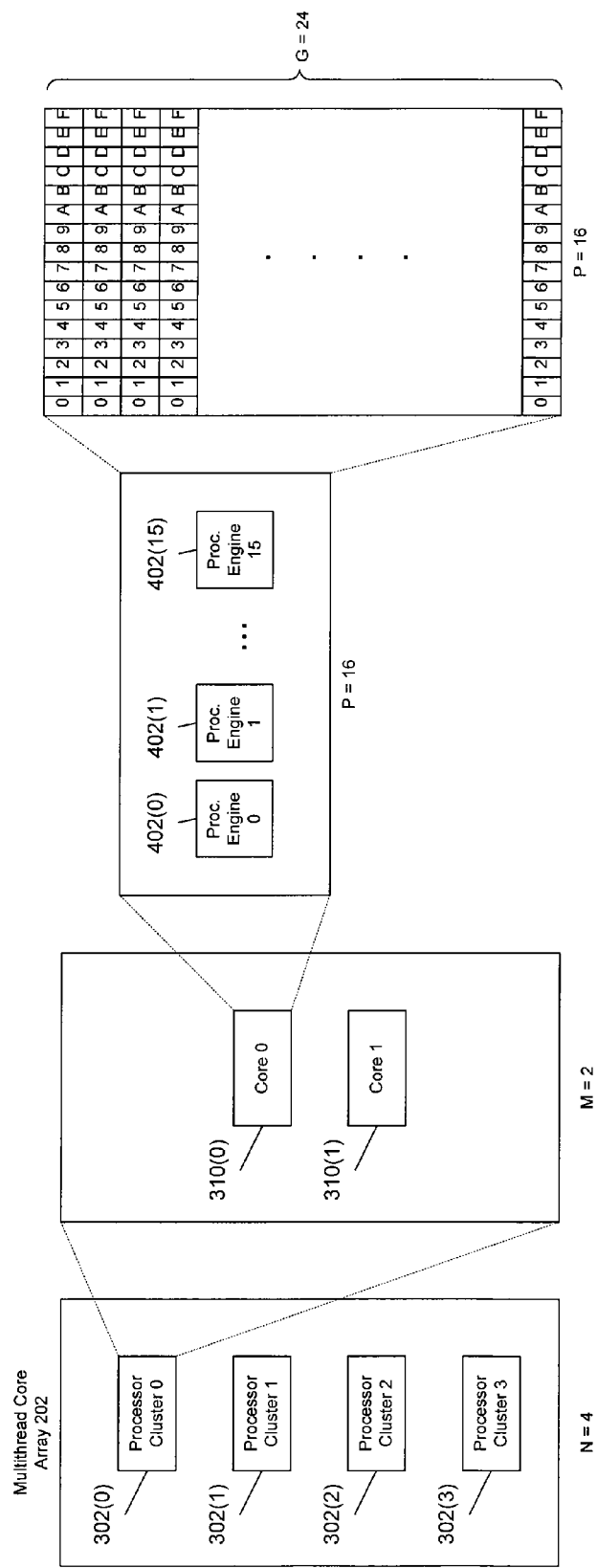
FIG. 6 presents a detailed view of the multiple threads that may be executing in a multithread core array, in accordance with an embodiment of the invention.

FIG. 6 presents a detailed view of the multiple threads that may be executing in a multithread core array 202 such as that shown in FIG. 5A, in accordance with an embodiment of the invention. The general structure of multithread core array 202 has been described in previous sections. Here, a specific example of multithread core array 202 is presented. In this example, multithreaded core array 202 comprises 4 (N=4) processing clusters 302. Each processing cluster 302 comprises 2 (M=2) cores 310. Each core 310 comprises 16 (P=16) processing engines 402. The 16 processing engines 402 have a single-instruction, multiple-data (SIMD) configuration. Thus, a single instruction may be issued to all 16 processing engines 402, each executing the instruction on a different set of input data. Each of these 16 individual executions may be referred to as a "thread." Collectively, these 16 individual executions may be referred to as a "SIMD group," as discussed previously.

Furthermore, the 16 processing engines 402 are also multithreaded in nature. Thus, at a first instant in time, the 16 processing engines 402 may be operating on a SIMD group corresponding to an instruction from a particular program. At a second instant in time, the 16 processing engines 402 may switch context to operate on a different SIMD group corresponding to an instruction from another program. In this manner, the 16 processing engines 402 may switch context between programs, for example, up to 24 (G=24) programs.

The total maximum number of "threads" supported by multithread core array 202 in this example is 3072 threads, which can be calculated as follows:

$$4 \text{ processing clusters} * 2 \text{ cores per processing cluster} * \\ (16 \text{ threads} * 24 \text{ programs}) \text{ per core} = 3072 \text{ threads}$$

Thus, thread count throttling may be performed to limit the actual number of threads of execution carried out by multithread core array 202 to a reduced number of threads of execution that is less than the maximum number of threads, as discussed previously.

Figure 7:
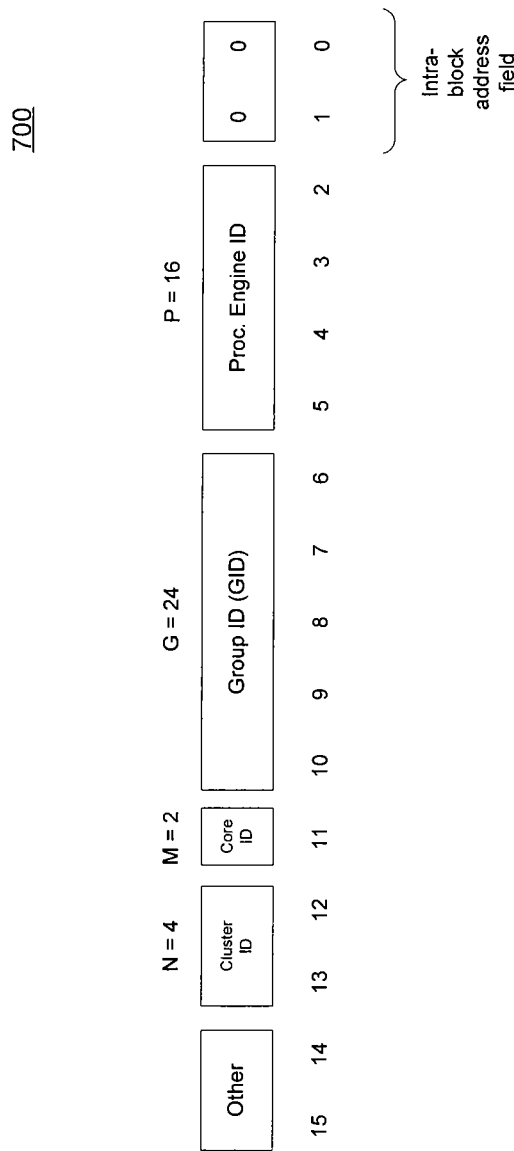
FIG. 7 illustrates an example addressing format used to address thread-specific memory, in accordance with an embodiment of the present invention.

FIG. 7 illustrates an example addressing format 700 used to address thread-specific memory, in accordance with an embodiment of the present invention. The thread-specific memory space allocated in frame buffer 226 may be divided into blocks. One block is assigned to each thread. That is, each thread of execution is allotted a separate block of memory within the thread-specific memory space. Just as an example, each thread may use its dedicated block of memory as a "scratch" area to store intermediate results.

Here, the blocks of memory are directly mapped to the individual threads of execution. In other words, there is an exact one-to-one mapping between each thread and its corresponding block of memory in the thread-specific memory space. Thus, the block of memory associated with a particular thread has an address that reflects the processing cluster 302, core 310, processing engine 402, and program to which the thread belongs. Here, multithreaded core array 202 comprises 4 (N=4) processing clusters 302. Thus, a 2-bit cluster ID specifies the cluster. Each processing cluster 302 comprises 2 (M=2) cores 310. Thus, a 1-bit core ID specifies the core. Each core 310 comprises 16 (P=16) processing engines 402. Thus, a 4-bit processing engine ID specifies the processing engine. Context may be switched from one program to another, for up to 24 (G=24) programs. Thus, a 5-bit group ID (GID) identifies the program. Finally, a 2-bit intra-block addressing field is shown. Here, each block assigned to a thread has a size of 4 bytes. Thus, the 2-bit field allows data within the 4 bytes of the block to be addressed.

According to an embodiment of the invention, addressing format 700 utilizes interleaving to organize the blocks of memory, such that blocks associated with threads belonging to the same SIMD group are located together in a contiguous addressing range. Such an organization makes SIMD group processing more efficient by allowing data for multiple threads to be fetched from the same region of memory. For example, in a particular clock cycle, a single instruction may be issued simultaneously to all 16 processing engines, each executing the instruction on a different set of input data. This represents a SIMD group containing 16 threads. Here, all 16 threads may need to access their respective blocks of thread-specific memory at the same time. For example, the 16 threads may need to simultaneously access their respective blocks to store intermediate results for the issued instruction.

By positioning the 16 corresponding blocks of memory together, blocks may be written or read in one or more groups, as opposed to individually.

As shown in FIG. 7, this organization is achieved by locating the processor engine ID as the least significant bits in the portion of the address that specifies the block (i.e., the portion of the address that does not include the intra-block addressing field). Thus, blocks associated with threads belonging to a SIMD group share the same upper addressing fields. That is, they all have the same cluster ID, core ID, and group ID. This creates a contiguous portion of memory for the SIMD group. As such, the 16 threads in the SIMD group always write to and read from blocks within this contiguous portion of memory. These writes and reads can thus be performed in one or more groups, as opposed to individually. This significantly improves the efficienty of accesses to the thread-specific memory within frame buffer 226.

According to one embodiment of the invention, thread count throttling can be turned ON or OFF to dynamically change the number of threads executed by multithread core array 202, without requiring flushing of pipelines. Specifically, multithread core array 202 may support two different modes of operation for thread count throttling—an ON mode and an OFF mode. In the ON mode, multithread core array 202 does not use thread-specific memory in frame buffer 226, but multithread core array 202 is allowed to execute the maximum number of threads that its hardware is capable of supporting. This mode may be associated with less memory-intensive routines that can be performed without accessing the additional memory provided in the thread-specific memory space in frame buffer 226. In the OFF mode, multithread core array 202 does use thread-specific memory in frame buffer 226, but multiprocessor core array 202 is only allowed to execute a reduced number of threads. The reduced number of threads may be calculated in the manner described previously. This mode may be associated with more memory-intensive routine that require the additional memory provided by the thread-specific memory space in frame buffer 226. Here, driver software executed in CPU 102 may control the selection of ON and OFF modes Toggling between the ON mode and the OFF mode does not require any change to the address mapping of the thread-specific memory space in frame buffer 226. In the ON mode, a reduced number of threads is selected, and the thread-specific memory space is mapped according to the reduced number of threads. Selecting a different reduced number of threads changes the mapping of the thread-specific memory space. However, in the OFF mode, the thread-specific memory space is not used at all, so the particular mapping associated with the previously selected reduced number of threads does not need to be changed. As such, multithread core array 202 can be dynamically toggled between the ON mode and the OFF mode, without requiring any pipeline flushing that may be needed in the case of transitioning from one reduced number of threads to another reduced number of threads. Such pipeline flushing is described in more detail below.

According to an embodiment of the invention, pipeline flushing may be needed in the process of changing the thread count limit placed on multithread core array 202 from one reduced number of threads to another reduced number of threads. This is discussed below using the same example of 4 (N=4) processing clusters, 2 (M=2) cores per processing cluster, 16 (P=16) threads, and 24 (G=24) programs described previously. Thus, at a particular point in time, the driver software may set the reduced number of threads to 2048 threads, which corresponds to a particular mapping of the thread-specific memory space. Referring to FIG. 7, the reduced number of 2048 threads may require a 4-bit GID field. This is because the number of allowable SIMD groups may be reduced to 16 SIMD groups given the reduced thread count of 2048. However, at another point in time, the driver software may set the reduced number of threads to 512 threads, which corresponds to a different mapping of the thread-specific memory space. Referring again to FIG. 7, the reduced number of 512 may now require only a 2-bit GID field. This is because the number of allowable SIMD groups may be reduced to 4 SIMD groups given the reduced thread count of 512. Thus, switching from a 4-big GID field to a 2-bit GID field changes the mapping of the thread-specific memory space. As mentioned in previous sections, processing engines 402 are pipelined components. If threads are executing in the pipeline when the driver software issues a command to switch from 2048 threads to 512 threads, multithread processor 202 may need to wait until the threads executing the pipeline complete their executions through the pipeline before applying the new reduced thread count of 512. By flushing the pipeline in this manner, multithread core array can avoid accesses to thread-specific memory space based on conflicting mappings of the thread-specific memory space.

Figure 8A:
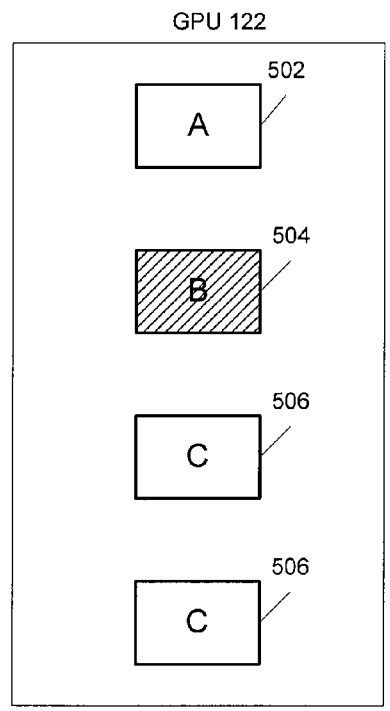
FIG. 8A illustrates a GPU having operative components and at least one disabled component, according to an embodiment of the invention.

FIG. 8A illustrates a GPU 122 having operative components and at least one disabled components, according to an embodiment of the invention. Here, GPU 122 is shown with similarly structured components 802, 804, 806, and 808 for carrying out multiple threads of execution. Each of these components may be, for example, a processing cluster 302 such as that described in FIG. 3. Due to manufacturing defects and/or other reasons, one or more of the similarly structured components may be rendered inoperative. Here, component 804 is such a disabled component. According to the present embodiment, GPU 122 may be operational despite the fact that component 804 is disabled. Thus, GPU 122 may function to carry out functions using just the remaining components 802, 804, and 806.

Figure 8B:
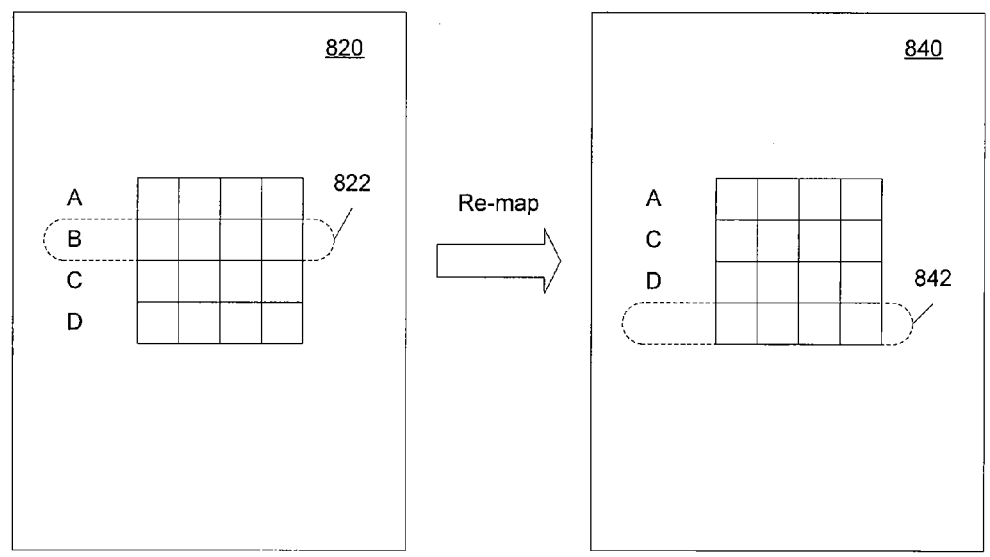
FIG. 8B illustrates a re-mapping of thread-specific memory space that utilizes otherwise wasted memory allotted to a disabled component, according to an embodiment of the invention.

FIG. 8B illustrates a re-mapping of thread-specific memory space that utilizes otherwise wasted memory allotted to a disabled component, according to an embodiment of the invention. Here, thread-specific memory space 820 is shown as having portions A, B, C, and D, which are allotted to serve as thread-specific memory to components 802, 804, 806, and 808, respectively. Because component 804 is disabled and placed out of operation, portion 822 of the memory space allotted for component 804 may become wasted. According to the present embodiment of the invention, a re-mapping of thread-specific memory space 820 may be performed, to generate re-mapped thread-specific memory space 840. As shown in the figure, re-mapped thread-specific memory space 840 now reclaims the portion 822 of memory left used by disabled component 804, by shifting the addresses of other portions of memory appropriately. As a result, a savings in memory space (portion 842) is associated with the operation of GPU 122 with one or more components disabled.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for performing graphics operations using a processor, the method comprising:
   operating the processor to carry out multiple threads of execution of graphics processing operations, wherein the processor comprises at least one execution unit supporting up to a maximum number of threads of execution;
   obtaining a defined memory allocation size for allocating, in at least one memory device, a thread-specific memory space for the multiple threads of execution;
   obtaining a per thread memory requirement corresponding to the thread-specific memory space;
   determining a thread count limit based on the defined memory allocation size and the per thread memory requirement; and
   sending a command to the processor to cause the processor to limit the number of threads carried out by the at least one execution unit to a reduced number of threads of execution, the reduced number of threads of execution being less than the maximum number of threads of execution,
   further comprising toggling the at least one execution unit between a first mode of operation for carrying out the maximum number of threads of execution and a second mode of operation for carrying out the reduced number of threads of execution,
   wherein toggling between the first mode and the second mode is performed dynamically, without requiring the processor to flush existing threads of execution through a pipeline in the at least one execution unit before starting new threads of execution,
   wherein in the first mode, the processor does not access the thread-specific memory space, and wherein in the second mode, the processor accesses the thread-specific memory space.

2. The method of claim 1 wherein driver software performs the steps of obtaining the defined memory allocation size, obtaining the per thread memory requirement, determining the thread count limit, and sending the command to the processor.

3. The method of claim 1 wherein the thread-specific memory space comprises a plurality of blocks of memory, each block of memory being associated with a thread of execution, and wherein blocks of memory associated with threads belonging to a SIMD group are organized together within a contiguous addressing range in the thread-specific memory space.

4. The method of claim 1 wherein the at least one execution unit comprises at least one specialized graphics function module to perform one class of graphics operations associated with a particular stage of graphics processing, and where the maximum number of threads of execution and the reduced number of threads of execution apply to the at least one specialized graphics function module.

5. The method of claim 1 wherein the at least one execution unit comprises at least one combined function module to perform multiple classes of graphics operations, each of the multiple classes of graphics operations being associated with a different stage of graphics processing, and wherein the maximum number of threads of execution and the reduced number of threads of execution apply to the at least one combined graphics function module.

6. The method of claim 1 further comprising allocating a stack memory space in the at least one memory device, wherein stack data corresponding to the multiple threads of execution are stored in the stack memory space.

7. The method of claim 1, wherein the at least one execution unit comprises a plurality of similarly structured components for carrying out the multiple threads of execution, including at least one operative component and at least one inoperative component;
   wherein the thread-specific memory space is decreased in size by allocating the thread-specific memory space for the at least one operative component and not for the at least one inoperative component.

8. A processor to perform graphics operations, the processor comprising:
   at least one execution unit for carrying out multiple threads of execution of graphics processing operations, wherein the at least one execution unit supports up to a maximum number of threads;
   wherein the processor interfaces with at least one memory device and supporting an allocation of thread-specific memory space in the at least one memory device, the allocation having a defined memory allocation size;
   wherein the processor responds to a command to limit the number of threads carried out by the at least one execution unit to a reduced number of threads of execution, the reduced number of threads of execution being less than the maximum number of threads of execution, the reduced number of threads of execution being determined based on the defined memory allocation size and a per thread memory requirement corresponding to the thread-specific memory space,
   wherein the thread-specific memory space comprises a plurality of blocks of memory, each block of memory being associated with a thread of execution, and wherein blocks of memory associated with threads belonging to a SIMD group are organized together within a contiguous addressing range in the thread-specific memory space,
   wherein the processor supports toggling of the at least one execution unit between a first mode of operation for carrying out the maximum number of threads of execution and a second mode of operation for carrying out the reduced number of threads of execution, and
   wherein in the first mode, the processor does not access the thread-specific memory space, and wherein in the second mode, the processor accesses the thread-specific memory space.

9. The processor of claim 8 wherein the processor communicates with driver software that obtains the defined memory allocation size, obtains the per thread memory requirement, determines the thread count limit, and sends the command to the processor.

10. The processor of claim 8 wherein the processor supports dynamically toggling between the first mode and the second mode, without flushing existing threads of execution through a pipeline in the at least one execution unit before starting new threads of execution.

11. The processor of claim 8 wherein the at least one execution unit comprises at least one specialized graphics function module to perform one class of graphics operations associated with a particular stage of graphics processing, and where the maximum number of threads of execution and the reduced number of threads of execution apply to the at least one specialized graphics function module.

12. The processor of claim 8 wherein the at least one execution unit comprises at least one combined function module to perform multiple classes of graphics operations, each of the multiple classes of graphics operations being associated with a different stage of graphics processing, and wherein the maximum number of threads of execution and the reduced number of threads of execution apply to the at least one specialized graphics function module.

13. The processor of claim 8 wherein the processor supports an allocation of stack memory space in the at least one memory device, wherein the stack memory space stores stack data corresponding to the multiple threads of execution.

14. The processor of claim 8, wherein the at least one execution unit comprises a plurality of similarly structured components for carrying out the multiple threads of execution, including at least one operative component and at least one inoperative component;
   wherein the thread-specific memory space is capable of decreased size resulting from allocation of the thread-specific memory space for the at least one operative component and not for the at least one inoperative component.

15. A processor to perform graphics operations, the processor comprising:
   at least one execution unit to carry out multiple threads of execution of graphics processing operations, wherein the at least one execution unit supports up to a maximum number of threads;
   wherein the processor interfaces with at least one memory device and supporting an allocation of thread-specific memory space in the at least one memory device, the allocation having a defined memory allocation size;
   wherein the processor responds to a command to limit the number of threads carried out by the at least one execution unit to a reduced number of threads of execution, the reduced number of threads of execution being less than the maximum number of threads of execution, the reduced number of threads of execution being determined based on the defined memory allocation size and a per thread memory requirement corresponding to the thread-specific memory space,
   wherein the processor supports toggling of the at least one execution unit between a first mode of operation for carrying out the maximum number of threads of execution and a second mode of operation for carrying out the reduced number of threads of execution, and
   wherein the processor supports dynamically toggling between the first mode and the second mode, without flushing existing threads of execution through a pipeline in the at least one execution unit before starting new threads of execution, and
   wherein in the first mode, the processor does not access the thread-specific memory space, and wherein in the second mode, the processor accesses the thread-specific memory space.

16. The processor of claim 15 wherein the processor communicates with driver software that obtains the defined memory allocation size, obtains the per thread memory requirement, determines the thread count limit, and sends the command to the processor.

\* \* \* \* \*